(No Model.)

A. HENTSCHKE.
REFUSE ATTACHMENT FOR TABLE PLATES.

No. 292,651. Patented Jan. 29, 1884.

Witnesses:
Will H Powell
Jas. B. Connolly

Inventor:
Albert Hentschke,
By Connolly Bros.,
Attorneys.

UNITED STATES PATENT OFFICE.

ALBERT HENTSCHKE, OF PHILADELPHIA, PENNSYLVANIA.

REFUSE ATTACHMENT FOR TABLE-PLATES.

SPECIFICATION forming part of Letters Patent No. 292,651, dated January 29, 1884.

Application filed December 7, 1883. (No model.)

*To all whom it may concern:*

Be it known that I, ALBERT HENTSCHKE, a citizen of the United States, residing at Philadelphia, in the county of Philadelphia and State of Pennsylvania, have invented a certain new and useful Refuse Attachment for Table-Plates; and I do hereby declare the following to be a full, clear, and exact description of the invention, reference being had to the accompanying drawings, which form part of this specification, in which—

Figure 1:
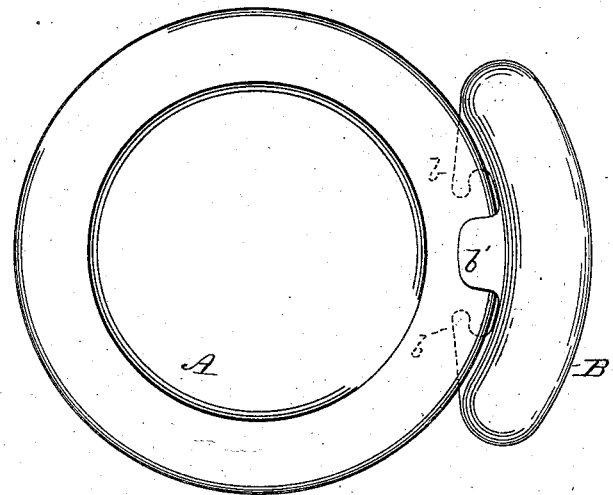
Figure 2:
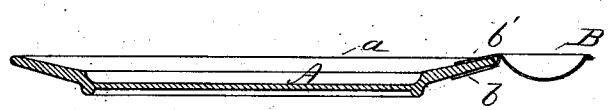

Figure 1 is a plan of a plate with my attachment thereon. Fig. 2 is a vertical section of plate and attachment.

My invention has for its object to provide a device adapted to form an attachment to or appendage of a table-plate and to serve as a receptacle for small refuse particles, such as fish-bones, potato-skins, &c.

Referring to the accompanying drawings, A designates a dinner or table plate of any ordinary, usual, or suitable construction, and B the device which constitutes my invention. Said device consists of a shallow pan, tray, or vessel, preferably segmental in its general outline and concave on its upper side, and having two lugs, $b\ b$, which pass under the edge $a$ of the plate A, and a middle lip, $b'$, which passes over said edge.

This device may be made of metal or other material, and will form a convenient receptacle and holder for such parts of food as are not desired to be retained on the plate, but which a decent regard for linen and the usages of polite society demand shall not be shoved off onto the table-cloth or thrown on the floor.

What I claim as my invention is—

1. A refuse-holder designed and adapted to form an attachment to table-plates, the same consisting of a pan or tray having means for securing it to a plate, substantially as and for the purpose set forth.

2. The device herein described, consisting of a shallow pan or tray, B, having lugs $b\ b$ and lip $b'$, constructed and adapted for attachment to a plate, substantially as shown and described.

In testimony that I claim the foregoing I have hereunto set my hand this 5th day of December, 1883.

ALBERT HENTSCHKE.

Witnesses:
ANDREW ZANE, Jr.,
M. D. CONNOLLY.